(12) United States Patent
Lanquetin et al.

(10) Patent No.: US 12,037,950 B2
(45) Date of Patent: Jul. 16, 2024

(54) PINION OF A TURBINE ENGINE SHAFT HAVING A WEB COMPRISING A CROSS-LINKED STRUCTURE

(71) Applicant: SAFRAN HELICOPTER ENGINES, Bordes (FR)

(72) Inventors: Rémi Joseph Lanquetin, Moissy-Cramayel (FR); Arnaud Georges Nifenecker, Moissy-Cramayel (FR); Antoine Lahittete, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 120 days.

(21) Appl. No.: 17/610,881

(22) PCT Filed: May 15, 2020

(86) PCT No.: PCT/EP2020/063641
§ 371 (c)(1),
(2) Date: Nov. 12, 2021

(87) PCT Pub. No.: WO2020/229668
PCT Pub. Date: Nov. 19, 2020

(65) Prior Publication Data
US 2022/0205523 A1    Jun. 30, 2022

(30) Foreign Application Priority Data

May 15, 2019   (FR) .................................. FR1905089

(51) Int. Cl.
*F02C 7/36*        (2006.01)
*B22F 5/00*        (2006.01)
(Continued)

(52) U.S. Cl.
CPC ................ *F02C 7/36* (2013.01); *B22F 5/009* (2013.01); *B22F 10/28* (2021.01); *B22F 10/47* (2021.01);
(Continued)

(58) Field of Classification Search
CPC .......... F16H 55/06; F16H 55/14; F16H 55/17; F16H 2055/065; F02C 7/36; B22F 5/009; B22F 10/28; B22F 10/47; B33Y 80/00
See application file for complete search history.

(56) References Cited

U.S. PATENT DOCUMENTS 1,725,124 A      8/1929  Banister
10,077,664 B2 *  9/2018  Clum ...................... F01D 11/08
(Continued)

FOREIGN PATENT DOCUMENTS

EP        2 753 851 B1     11/2015
WO    WO-2020234528 A1 *  11/2020  .............. B22F 10/20
WO    WO-2022175616 A1 *   8/2022

OTHER PUBLICATIONS

French Search Report for French Application No. 1905089, dated Apr. 20, 2020.
(Continued)

*Primary Examiner* — Adam D Rogers
(74) *Attorney, Agent, or Firm* — Birch, Stewart, Kolasch & Birch, LLP

(57) ABSTRACT

The present invention relates to a pinion for a gear train of an aircraft turbine engine, the pinion comprising: —a cylindrical body (2) extending along an axis and configured to engage with a shaft received in the cylindrical body, —a rim (4) concentric with the cylindrical body, —a web (3) defined axially by a front wall (32) and a rear wall (33) and extending radially from the cylindrical body to the rim, each of the front and rear walls having a density, the pinion
(Continued)

comprising a cross-linked structure (5) around the cylindrical body between the front wall and the rear wall, the cross-linked structure comprising a unit cell repeated along three axes of a three-dimensional coordinate system, a density of the unit cell being strictly less than each of the densities of the front and rear walls.

19 Claims, 6 Drawing Sheets

(51) Int. Cl.
  *B22F 10/28* (2021.01)
  *B22F 10/47* (2021.01)
  *B33Y 80/00* (2015.01)
  *F16H 55/06* (2006.01)
  *F16H 55/14* (2006.01)
  *F16H 55/17* (2006.01)

(52) U.S. Cl.
  CPC ............. *F16H 55/06* (2013.01); *F16H 55/14* (2013.01); *F16H 55/17* (2013.01); *B33Y 80/00* (2014.12)

(56) References Cited

U.S. PATENT DOCUMENTS

2014/0216191 A1* 8/2014 Marsaudon ............. F16H 55/14
  156/60
2016/0175932 A1 6/2016 Dimter et al.
2021/0131322 A1* 5/2021 Nifenecker ............ B01D 45/14

OTHER PUBLICATIONS

International Search Report for International Application No. PCT/EP2020/063641, dated Jun. 9, 2020.

* cited by examiner

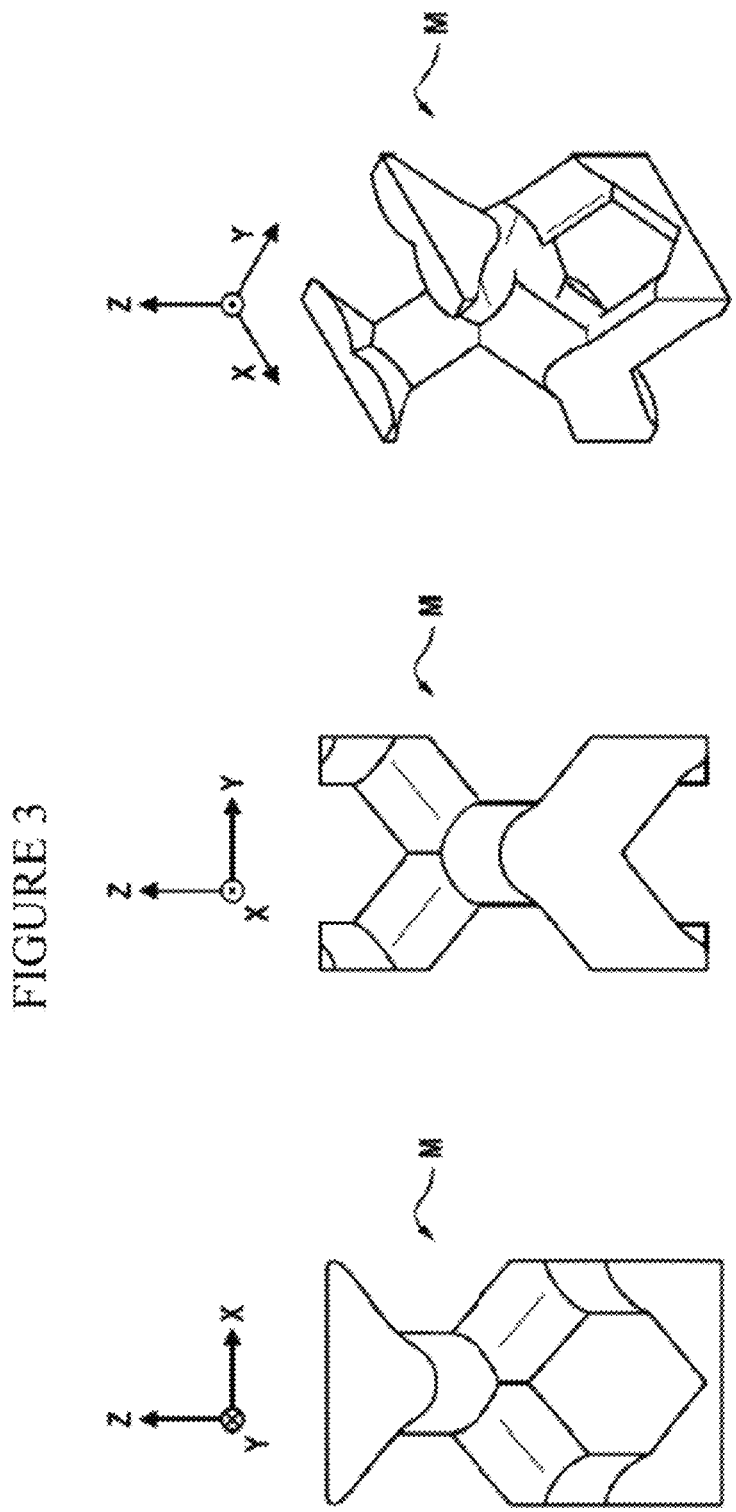

PINION OF A TURBINE ENGINE SHAFT HAVING A WEB COMPRISING A CROSS-LINKED STRUCTURE

FIELD OF THE INVENTION

The invention falls within the field of power transmission devices with gear trains for an aircraft turbomachine.

In particular, the invention relates to a pinion for a transmission shaft of an aircraft turbomachine, as well as a reduction gearbox comprising a pinion of this type, a turbomachine comprising a pinion of this type and a manufacturing method for a pinion of this type.

PRIOR ART

The mechanical power generated by the rotation of the movable elements of a turbomachine is conventionally transmitted to other members of the aircraft by geared transmission devices.

By way of an example, a helicopter turbine engine comprises, in known manner, a reduction gearbox accomplishing transmission between the shaft connected to the free turbine and the output shaft. The reduction gearbox comprises a gear train and a train for driving accessories. Based on the rotation movement of the free turbine, the reduction gear train communicates a rotation movement with a reduced speed to the main transmission gearbox for driving the rotors of the helicopter. The accessory drive train transmits the rotation movement to the different accessories necessary to the operation of the turbine engine: lubrication members, fuel pumps, electrical power supply members . . . .

The different mechanical force transmission chains in the reduction gearbox comprise gearing with pinions accomplishing the transmission steps with a predetermined reduction ratio.

Conventionally, a pinion comprises a hub extending along an axis with a hollow cylindrical space intended to receive a shaft of the turbomachine, as well as teeth on a rim positioned all around the hub. In known pinions, the rim is connected to the hub by a simple web. The simple web can be assimilated to a solid disk with a smaller thickness than the maximum thickness of the rim. The disk is perforated at its center at the hub, to allow a shaft cooperating with the pinion to pass.

In aeronautical applications, it is desired to reduce the mass of the parts of the turbomachines in order to limit the total fuel consumption and optimize the reliability of the parts. The reduction of the mass of a turbomachine part (by removing material in certain zones) must not occur to the detriment of its mechanical performance, and it is appropriate to optimize the properties of each zone of the part depending on the mechanical loads expected for this zone.

As regards the pinions of transmission devices in particular, it is appropriate to be attentive to the retention of the rim in deformation under load and to the modal behavior of the pinion during the operation of the turbomachine. In the case where the rim of the pinion comprises lateral cantilevers on either side of the web, these cantilevers can undergo large vibrations during operation and be weakened.

The level of mechanical performance of turbomachine shaft pinions can therefore be improved.

Moreover, to reduce the mass of the pinion, it has been proposed to make the solid web of the pinion into openwork by making a plurality of through perforations. However, making the web into openwork can reduce the performance of the pinion by increasing windage losses, and the mass reduction thus allowed is still insufficient.

DISCLOSURE OF THE INVENTION

Thus there exists a need for a turbomachine shaft pinion having a smaller mass in order to limit the on-board mass of the turbomachine, while having optimized mechanical properties. It is desired to distribute the forces on the web of the pinion so as to avoid excessive local mechanical stresses, during the operation of the transmission device incorporating the pinion.

In particular, deformations under load of the web and of the rim must be limited. It is also desired to limit vibrations at the lateral faces of the web.

Additionally, a manufacturing method is sought that allows obtaining a turbomachine shaft pinion of reduced mass. The method being sought must allow precise control of the mechanical structure of the pinion to optimize the mechanical properties of each zone of the part depending on the expected levels of stress.

To respond to these needs, a first object of the invention is a pinion for an aircraft turbomachine gear train, the pinion comprising:
  a cylindrical body extending along an axis and configured to engage with a shaft received in the cylindrical body,
  a rim concentric with the cylindrical body,
  a web delimited axially by a front wall and a rear wall and delimited radially by the rim, each of the front and rear walls having a density,
  the pinion being characterized in that the web comprises a cross-linked structure around the cylindrical body between the front wall and the rear wall, the cross-linked structure comprising a unit cell repeated along three axes of a three-dimensional coordinate system, a density of the unit cell being strictly less than each of the densities of the front and rear walls.

The pinion of the invention also comprises a web of which the internal volume is partially occupied by a cross-linked structure, the density of which is less than that of the front and rear walls axially delimiting the web. An improvement in mass is thus accomplished and the on-board mass of a turbomachine comprising the pinion is reduced. It will be noted that the reduction of mass thus allowed does not require turning the web into openwork.

Moreover, current techniques for manufacturing structures, for example of the lattice type (particularly additive manufacturing), allow conferring mechanical properties upon the cross-linked structure that are necessary for the load tolerance of the pinion. The stiffness contributed to the web by the cross-linked structure allows contemplating a reduction of thickness of the lateral surfaces of the web, or even a reduction of thickness of the cantilevers of the rim.

Thus, the pinion of the invention allies mass improvement and optimized mechanical properties.

Other additional and non-limiting features of the pinion of the invention are the following, taken alone or in any one of their technically possible combinations:
  the cross-linked structure extends radially to an interface between the cross-linked structure and the rim.
  the cross-linked structure has axial symmetry around the axis of the cylindrical body.
  the front wall and/or the rear wall extend radially from the cylindrical body to the rim.
  the rim comprises a cantilever extending axially beyond the front wall or beyond the rear wall.

in the latter case, an average axial width of the cantilever is less than 80% of an average axial width of the rim.

the radial distance between the cross-linked structure and the cylindrical body, in any axial position along the axis, is greater than a nonzero minimum radial gap.

the front wall and the rear wall achieve a material continuity with the cylindrical body and with the rim, the front and rear walls joining the rim at the interface.

the cell of the cross-linked structure has a hexagonal diamond geometry.

a material density of the cell of the cross-linked structure is less than or equal to 5%.

A second object of the invention is a reduction gearbox for an aircraft turbomachine, the reduction gearbox comprising a reduction gear train configured to couple in rotation a turbine shaft of a turbomachine and an output shaft of said turbomachine, the reduction gear train comprising a pinion as defined above.

A third object of the invention is an aircraft turbomachine, preferably a helicopter turbine engine, the turbomachine comprising at least one shaft and comprising a pinion as defined above, the shaft being coupled in rotation with the pinion. A fourth object of the invention is an aircraft comprising a turbomachine of this type.

A fifth object of the invention is a manufacturing method for a pinion for an aircraft turbomachine gear train, the method comprising successive steps of:

obtaining a cylindrical body of the pinion, obtaining a front wall of a web of the pinion and obtaining a rim which achieves material continuity with the front wall, the front wall having a density, positioning, against the front wall, a cross-linked structure having been obtained by repetition of a unit cell along three axes of a three-dimensional coordinate system, a density of the unit cell being strictly less than the density of the front wall, obtaining a rear wall of the web of the pinion, against the cross-linked structure, so that a density of the rear wall is strictly greater than the density of the cross-linked structure, the cylindrical body, the front and rear walls of the web and the rim being obtained in a single piece by additive manufacturing, the web thus obtained incorporating the cross-linked structure.

The manufacturing method has, optionally and without limitation, the following features taken alone or in combination:

the front and rear walls of the web are obtained by selective laser melting on a powder bed.

the method comprises a step of obtaining the cross-linked structure, said step comprising the repetition of the unit cell along the three axes to obtain a deformable matrix and also comprising a deformation of the deformable matrix, preferably by stretching, to confer a predetermined shape on the deformable matrix.

during the positioning step, contact between the front wall and the cross-linked structure is accomplished with a first inclination with respect to a plane perpendicular to the axis of the cylindrical body, the first inclination preferably being greater than 20 degrees, and during the step of obtaining the rear wall, contact between the rear wall and the cross-linked structure is accomplished with a second inclination with respect to said plane, the second inclination being strictly less than the first inclination, the cross-linked structure serving as a support for obtaining the rear wall.

DESCRIPTION OF THE FIGURES

Other features, aims and advantages of the invention will be revealed by the description that follows, which is purely illustrative and not limiting, and which must be read with reference to the appended figures, among which:

FIG. 3 shows an example of a three-dimensional cell for the cross-linked structure inside the pinion;

DETAILED DESCRIPTION OF THE EMBODIMENTS

The description hereafter relates to the example of a pinion adapted to be used in a gear train of a reduction gearbox of a helicopter turbine engine. It will be understood that the pinion of the invention can be used, with the same advantages, for any gear intended to cooperate with a shaft of a turbomachine.

In all the following, similar elements shown on the appended figures are designated with the same alphanumeric references.

Architecture of the Turbine Engine

Figure 1:
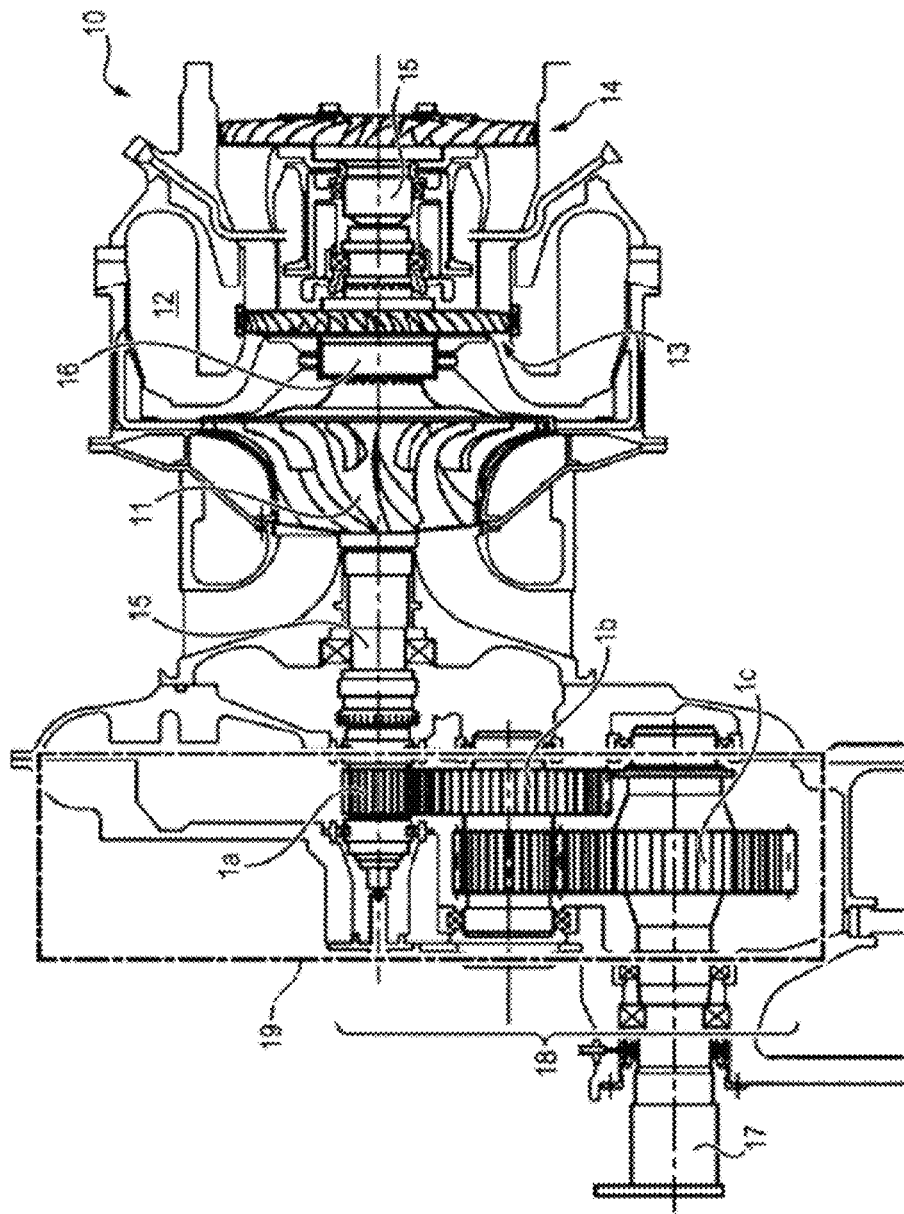
FIG. 1 is a schematic section view of a helicopter turbine engine.

Shown in FIG. 1 is a helicopter turbine engine 10. The rotors (not shown) of the helicopter are driven by the free turbine 14 by means of a reduction gearbox schematically labeled with reference 19 in FIG. 1. The turbine engine 10 comprises a compressor 11, a combustion chamber 12, a linked turbine 13 and a free turbine 14. The linked turbine 13 is linked to the compressor 11 by a shaft 20. The free turbine 14 is attached to a turbine shaft 15. In known fashion, the turbines transform the energy released by the exhaust gases into mechanical energy for the rotors of the helicopter.

The shaft 15 constitutes an input shaft for the reduction gearbox 19. The latter also has an output shaft 17. Mechanical transmission between the input shaft 15 and the output shaft 17 is provided inside the reduction gearbox 19 by a reduction gear train 18. The reduction gear train communicates a movement of rotation, with a reduced speed proportional to the speed N2 of the turbine engine, to a main transmission gearbox by means of the shaft 17. The reduction gearbox also comprises an accessory drive gearbox (not shown in FIG. 1) which transmits a movement of rotation, at a speed proportional to the speed N1, to the different accessories necessary to the operation of the turbine engine: lubrication members, fuel pumps, electrical power supply members . . . .

The reduction gear train 18 comprises a drive pinion 1a, first and second intermediate pinions 1b, and an output pinion 1c. Here, the said four pinions are helical gear wheels.

The drive pinion 1a is linked to the input shaft 15 and engages with the first of the intermediate pinions 1b. The second of the intermediate pinions 1b engages with the output pinion 1c, which is linked to the output shaft 17. The reduction gear train achieves a predetermined reduction ratio. By way of an example, during the operation of the turbine engine 10, the speed of rotation of the drive pinion 1a is 42,014 revolutions per minute and the speed of rotation of the output pinion 1c is 5,610 revolutions per minute.

Structure of the Pinion

Figure 2A:
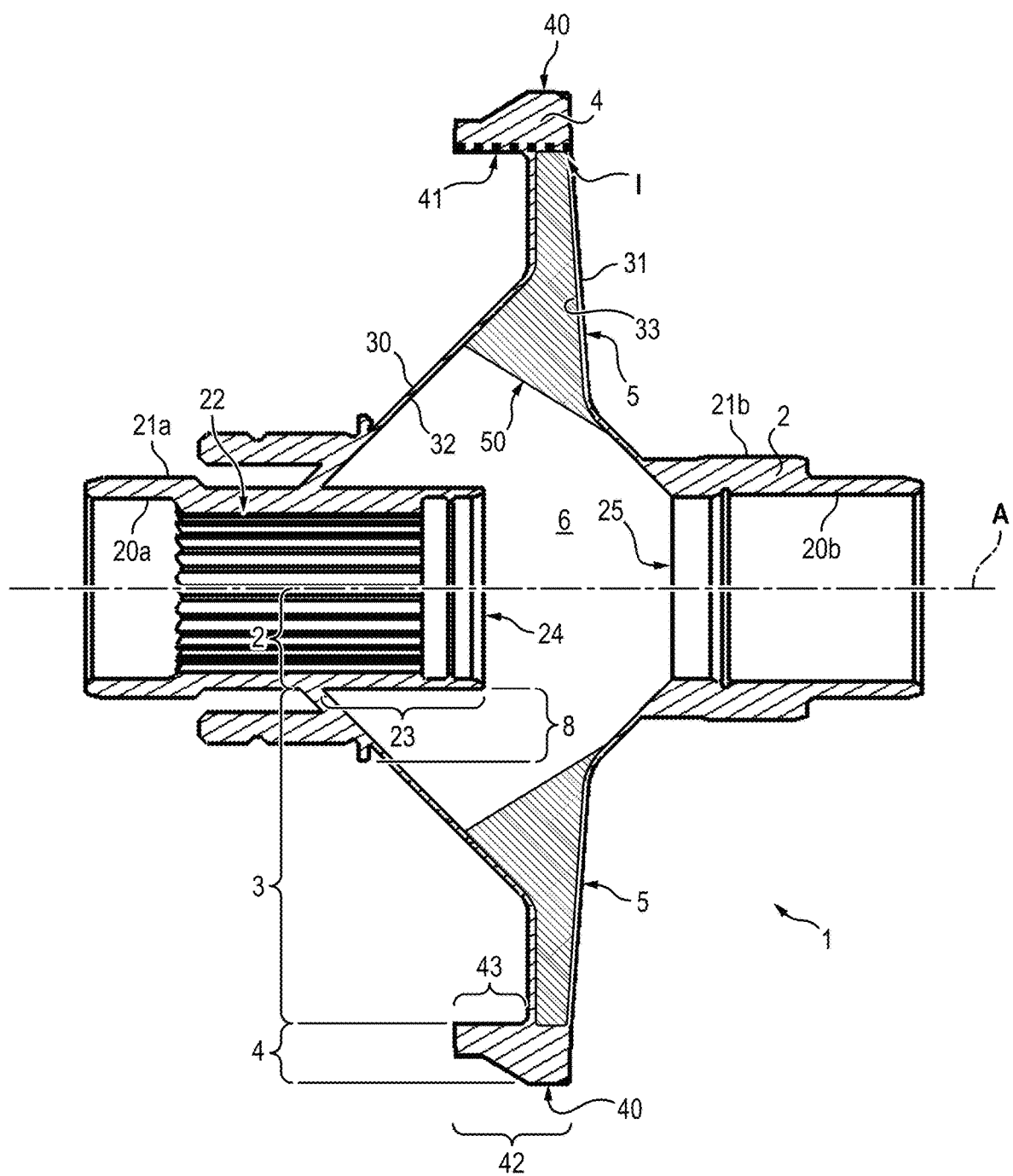
FIG. 2a is a schematic view of an intermediate pinion of the turbine engine of FIG. 1, according to one embodiment of the invention, seen in longitudinal section along one axis of the hub of the pinion.

Shown in longitudinal section in FIG. 2a is an example of a pinion 1 complying with the invention. The pinion 1 is adapted to be used in a reduction gear train of a reduction gearbox of a turbine engine, for example as a drive pinion, as an intermediate pinion or as an output pinion. The pinion includes a hub 2 with a generally cylindrical shape, configured to engage with a turbomachine shaft extending along the axis A. The hub 2 supports a web 3 and a rim 4 concentric with the hub 2. What is meant by "concentric" is that an internal face of the rim 4 is centered on the same axis A as the hub 2. The rim 4 includes teeth 40 configured to engage with other teeth of another gear. For example, if the pinion is an input pinion 1a, the teeth 40 are configured to engage with teeth of an intermediate pinion 1b placed facing it. Preferably, there exists a continuity of material between the hub 2, the web 3 and the rim 4.

Throughout the following, the radial direction is labeled with respect to the axis A.

The hub 2 includes a front portion and a rear portion. In FIG. 2a, the front portion is located to the left and the rear portion is located to the right.

The front portion of the hub includes an internal wall 20a and an external wall 21a and leads into a hollow space 6 of the pinion by a circular opening 24. The rear portion of the hub includes an internal wall 20b and an external wall 21b and leads into the same hollow space 6 by a circular opening 25. A portion of the internal wall 20a of the front portion of the hub comprises splines 22, intended to engage with complementary elements of an external wall (not shown) received in the hub 2, in order to secure in rotation the pinion and said shaft.

The web 3 extends radially from the hub 2 to the rim 4. The web 3 is secured to the front portion of the hub, via a front wall 32 having a front surface 30. The web 3 is also secured to the rear portion of the hub, via a rear wall 33 having a rear surface 31. The web 3 is also secured to the rim.

The web 3 is delimited axially by the front wall 32 and the rear wall 33 and is delimited radially by the rim 4.

Figure 2B:
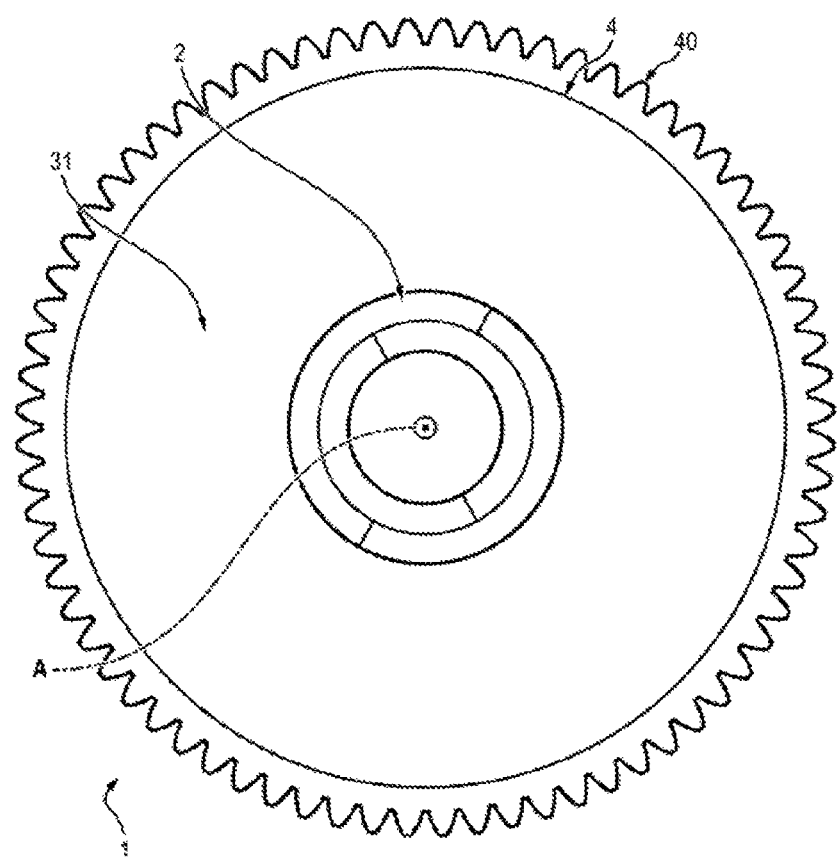
FIG. 2b shows the pinion of FIG. 2a in side view from its rear portion.

FIG. 2b illustrates the same pinion in side view along a vision axis congruent with the axis A of the hub 2, from the rear portion of the hub. As can be seen in FIG. 2b, the rear surface 31 of the web 3 of the pinion does not necessarily have through perforations (likewise the front face, which is not visible in this figure). In fact, the cross-linked surface comprised in the web is of lower mass compared to a solid web which would occupy the same space, and it is not necessary to make the web into openwork.

In the example of FIGS. 2a and 2b, the front wall 32 comprises, on the lower part of its radial extension, an interior surface and an exterior surface. The two surfaces are parallel and each have an inclination of approximately 40° with respect to a plane orthogonal to the axis A (vertical in the figure). The front portion of the hub 2 protrudes toward the interior of the pinion from the interior surface of the front wall 32. Thus, the front wall 32 of the web extends radially outward and axially rearward from the exterior wall 21a of the front portion of the hub, with a funnel shape.

Likewise, the lower portion of the rear wall 33 extends radially outward and axially forward, as a funnel, from the external wall 21b of the rear portion of the hub.

The web 3 also comprises a cross-linked structure 5 around the cylindrical body 2 between the front wall 32 and the rear wall 33. The cross-linked structure is formed by all or part (totally here) of a repetition of the same unit cell. The unit cell is repeated in the three directions of space to form the cross-linked structure 5. To designate a cross-linked structure of this type, it is usual to use the term "lattice."

A density of the unit cell of the cross-linked structure is strictly less than each of the densities of the front and rear walls. Thus, the mass of the cross-linked structure 5 is less than a mass of the material in the continuity of the front and rear walls which would occupy the same volume as the cross-linked structure within the web. The cross-linked structure 5 thus fills the space between the front wall 32 and the rear wall 33 while allowing a reduction of the total mass of the pinion.

The structure of the web 3 of the example of FIG. 2a is detailed hereafter.

The rim 4 has, in the example of FIG. 2a, a cantilever 41 forward. The cantilever 41 extends axially beyond the front wall 32 and protrudes from the front surface 30 of the web.

Numerous configurations are possible regarding the position of the cantilever of the rim with respect to the web.

In the present example, the cantilever 41 extends forward over an average axial width 43 which is less than 80% of an average axial width 42 of the rim 4, preferably less than 66% as in FIG. 2a.

Alternatively, the pinion can include a web centered axially with respect to the rim. The pinion then has a rim with a rear cantilever in the same order of dimension size as the front cantilever. It is also possible to provide a front cantilever and a rear cantilever which do not have the same axial dimensions.

Still alternatively, the pinion may not have a front cantilever and have only a rear cantilever.

If necessary, the thickness ratio of a cantilever of the rim 4 with respect to the web can be further reduced, with respect to the dimensions of the cantilever 41 illustrated in FIG. 2a, without jeopardizing the mechanical properties of the pinion. This reduction of the thickness ratio can be obtained by increasing the axial width of the cross-linked structure 5. Alternatively, the pinion may not have a cantilever.

Web

In compliance with the invention, the pinion comprises, in the internal volume of the web 3, a cross-linked structure 5.

What is meant by a "cross-linked structure" is a mechanical structure obtained by multiple repetitions in space of a three-dimensional unit cell. Here the cell is repeated along three dimensions of space that are mutually orthogonal. The cross-linked structure has a low density, the volume occupied by the three-dimensional cell consisting largely of empty space. The density of the cross-linked structure 5 is strictly less than the density of the front wall 32 and of the rear wall 33 of the web 3. By way of an example, the density of the cross-linked structure 5 is more than ten times less than that of the walls 32 and 33.

The presence of the cross-linked structure 5, instead and in place of the volume of material which would fill the axial space between the two webs in the absence of the cross-linked structure, allows very great mass improvements without sacrificing the mechanical performance of the pinion.

The presence of the cross-linked structure can allow a reduction of more than 15%, or even up to 20% of the mass of the pinion. In the present example, for a pinion the mass of which is initially 3.1 kilograms if a solid web replaced the cross-linked structure, a mass improvement of 600 grams is achieved and the mass of the pinion including the cross-linked structure is reduced to 2.5 kilograms.

The presence of the cross-linked structure 5 allows in particular reducing the thicknesses of the front 32 and rear 33 walls, with respect to the case where a hollow space would occupy the volume of the reticulated structure. The maximum thicknesses of the front and rear wall are preferably less than 50% of the minimum thickness of the cross-linked structure along the axis A, and even more preferably less than 25% of the latter thickness as illustrated in FIG. 2a. This participates in reducing the total mass of the pinion.

The reduction in thickness of the front and rear walls 32 and 33 is not accomplished to the detriment of the mechanical properties of the web. The mechanical stiffness contributed by the cross-linked structure 5 allows reducing the maximum resonance of the front and rear walls of the web 3 when the pinion is under load.

In the absence of the cross-linked structure, the rim 4 could be subject to an excessive deformation under load. The stiffness contributed by the cross-linked structure 5 allows strongly reducing this deformation. An acceptable level of deformation of the rim under load depends on the type of teeth intended to be used facing the rim. Here, a deformation of the rim under load of less than 50 micrometers is sought.

The mechanical strength conferred by the cross-linked structure 5 allows redistributing the mechanical stresses in the web and reducing the maximum stresses, which extends the reliability and the lifetime of the pinion. What is sought are maximum stresses less than the fatigue capacity of the material constituting the front and rear walls of the web.

In this example, the cross-linked structure 5 has axial symmetry around the axis A of the hub 2, which facilitates the manufacture of the pinion.

In this example, the cross-linked structure 5 extends advantageously to the rim 4 in the radial direction. An external radial portion of the cross-linked structure 5 is in contact with the rim 4 at an interface I shown in dotted lines in FIG. 2a. Thus, the cross-linked structure supports the rim radially.

Alternatively, a radial space can be provided between an external radial portion of the cross-linked structure and the internal side of the rim 4.

In the example of FIG. 2a, the cross-linked structure 5 is not in radial contact with the front portion of the hub 2, nor with the rear portion of the hub 2. All along the axis A, the radial distance between an internal radial wall 50 of the cross-linked structure 5 and the hub 2 is greater than a nonzero minimum radial gap 8. Preferably, the minimum radial gap 8 is greater than or equal to 10% of the total radial extension of the cross-linked structure, preferably greater than or equal to 20%.

One advantage of this configuration is to increase the total mass reduction of the pinion. A minimal radial gap of 20% of the radial extension of the cross-linked structure achieves a satisfactory compromise between reduction of mass and retention of the stiffness of the web. Unlike pinion structures frequently observed in turbomachines, the total mass of the pinion is thus reduced without it being necessary to make the web of the pinion into openwork. Supplementary losses due to windage are thus avoided.

Cross-Linked Structure

Advantageously, the cross-linked structure 5 consists of at least 90%, preferably 100% of a three-dimensional cell M of the hexagonal diamond type repeated in space in the three dimensions of space. The cross-linked structure thus comprises a three-dimensional lattice formed by the repetition of the hexagonal diamond cell.

Alternatively, the cross-linked structure can be formed, all or in part, from the repletion of a three-dimensional cell of the centered cubic type.

A material of the cross-linked structure is typically a metallic material, such as steel. Alternatively, the cross-linked structure can be formed of polymer.

The cross-linked structure can in particular be obtained by additive manufacturing, particularly by selective laser melting (SLM). The cross-linked structure is then obtained by melting a metallic powder. One advantage of the latter technique is its reliability and its speed of execution.

The hexagonal diamond cell M is shown in FIG. 3. FIG. 3 shows the cell M in three views and in perspective, in three different viewing angles in the same three-dimensional coordinate system (X, Y, Z).

The material density of the hexagonal diamond cell is advantageously less than 10% so as to limit the overall mass of the cross-linked structure and allow a large improvement in the on-board mass of the turbomachine comprising the pinion. This material density must, however, remain sufficiently high to guarantee good mechanical strength of the cross-linked structure. The material density of the cell is $\frac{1}{20}^{th}$ here, or 5%. In other words, the ratio between the volume occupied by empty space and the total volume occupied by the cross-linked structure is 95%. However, the material density of the cross-linked structure can be modulated in order to minimize the stresses exerted, when the pinion is under load, on the cross-linked structure.

It will be noted that, although the cross-linked structure according to the example shown in FIGS. 2a, 2b and 3 is entirely constituted of the repetition of a hexagonal diamond cell like that shown in FIG. 3, several three-dimensional cell geometries can be integrated into a single cross-linked structure. The cross-linked structure then comprises several zones each consisting of a repetition of a three-dimensional cell.

Manufacturing Method of the Pinion

Figure 4:
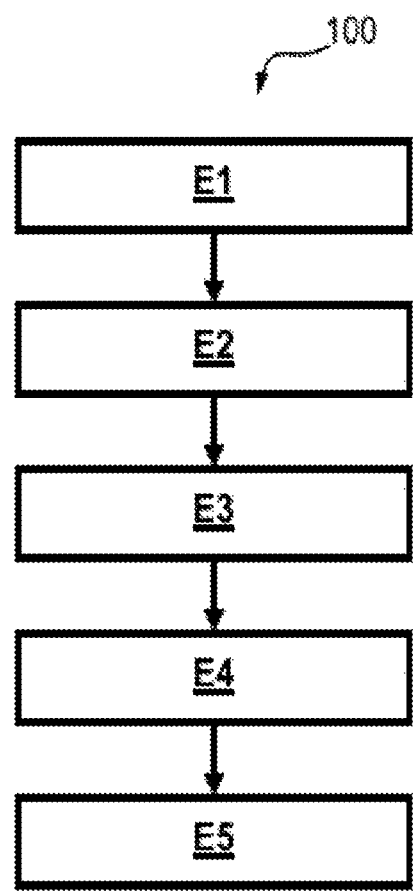
FIG. 4 shows the steps of a manufacturing method for the pinion according to one embodiment of the invention.

Shown in FIG. 4 are the steps of a manufacturing method 100 of the pinion according to one embodiment of the invention. The method 100 allows, for example, obtaining a reduction gear train pinion of the turbomachine like the pinion shown in FIG. 2a. Hereafter, the example of the pinion of FIG. 2a will be used.

In an optional step E1, the cross-linked structure 5 is manufactured and adapted to the desired shape for the front and rear walls of the pinion. Very advantageously, the cross-linked structure 5 is obtained by additive manufacturing. Additive manufacturing constitutes a rapid and very flexible solution for obtaining the cross-linked structure 5 at moderate cost. A very large variety of cross-linked structure geometries can be obtained by additive manufacturing, both in terms of shape and material density of the mesh and in the shape of the walls of the cross-linked structure.

For example, a deformable matrix is manufactured by additive manufacturing and is then formed to obtain the reticulated structure 5. The matrix obtained initially can have a parallelepipedal shape. To adapt the cross-linked structure with the desired shape for the pinion, it is appropriate to give to the structure an overall cylindrical shape. This shape can be obtained by stretching and/or by cutting the matrix.

One advantage of forming by stretching is in avoiding the cells located at the edge of the cross-linked structure being open. What is meant by "open cell" is a cell in which one or more edges interrupt the pattern. In fact, open cells have smaller mechanical strength compared to non-open cells.

It is also suitable to perforate the cross-linked structure 5 at its central axis, to be able to position the cross-linked structure around the hub.

Optionally and advantageously, the edges of the cross-linked structure 5 are stretched before producing the front wall 32 against the cross-linked structure. It has been noted that the edges of an unstretched cross-linked structure, and particularly the corners, can be subject locally to much greater mechanical stresses than the other zones of the structure. This phenomenon is known by the name "KT effect." The Applicant has observed that stretching the edges allows a local reduction in the maximum level of mechanical stress to which the edges are subjected.

Figure 5A:
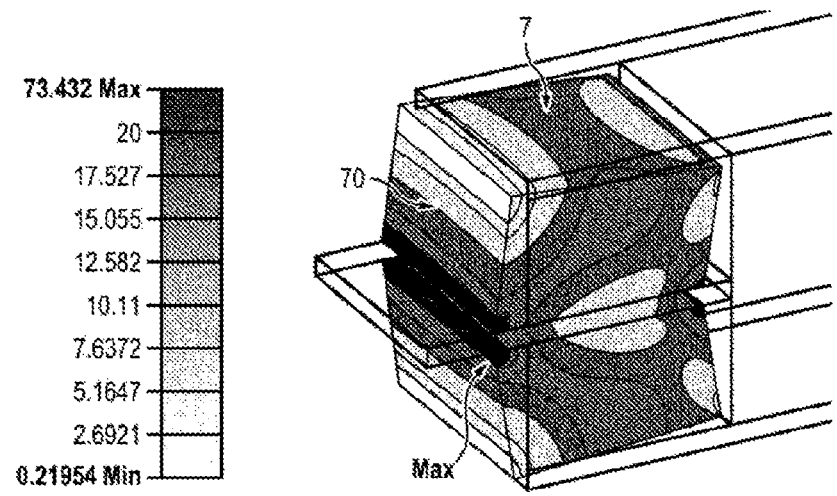
FIGS. 5a and 5b are maps of the stresses exerted on a model of a cross-linked structure during a mechanical test, respectively before and after stretching of a front face of the cross-linked structure model.

By way of illustration, a three-dimensional map of the stresses within a cross-linked structure 7 is shown in FIG. 5a, obtained by repetition of a hexagonal diamond cell, subjected to a load on its lower and upper faces during a mechanical test.

Figure 5B:
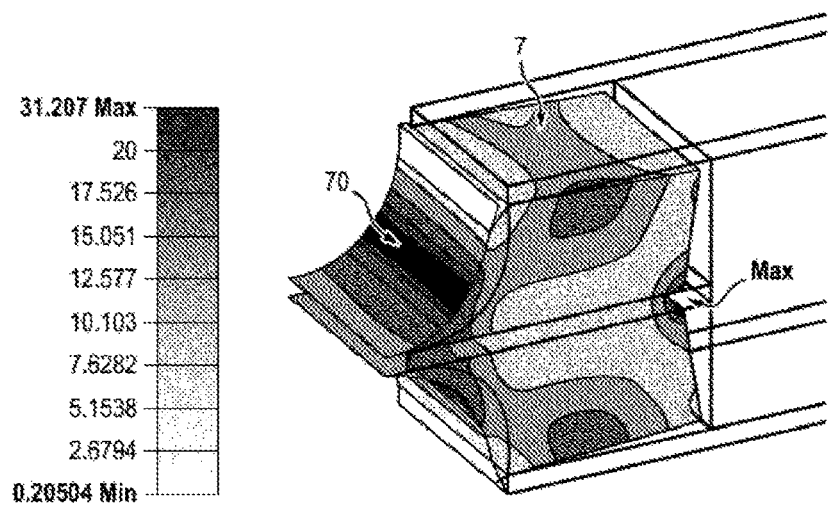

Shown in FIG. 5b is a three-dimensional map of the stresses within the same control structure 7 after stretching of a front face 70 of the control structure.

Before stretching, the maximum mechanical stress undergone by the control structure 7 during the test is 73,432 pascals and is observed on the front face 70.

After forward stretching of the front face 70 as illustrated in FIG. 5b, the mechanical stresses undergone by the front face 70 are redistributed and reduced. The maximum stress point is no longer observed on the front face 70, but rather at the rear of the structure. The stresses on the front face 70 are less than 31,207 pascals.

Thus, by stretching the reticulated structure 5 of the pinion, it is possible to reduce the maximum stress level to which the cross-linked structure is subjected under load, and increase the lifespan and the reliability of the pinion. For example, the lower edge of the front face (on the left in la FIG. 2a) of the cross-linked structure 5 is stretched forward, to confer upon the cross-linked structure 5 the trapezoidal shape visible in FIG. 2a.

Returning to FIG. 4, the method 100 then comprises a step E2 of obtaining a cylindrical body of the pinion, here of the hub 2. The hub is preferably obtained by additive manufacturing. As an alternative, the hub is manufactured by any means known to a person skilled in the art.

At a step E3, a front wall 32 is obtained and the rim 4 fastened to the hub 2. Preferably, the front wall 32 and the rim 4 are obtained in the continuation of the front portion of the hub 2.

Advantageously, the teeth 40 of the rim 4 can be blanked by additive manufacturing during the step E3 or subsequently during the method 100. Thus, it is possible to dispense with a subsequent step of blanking the teeth by cutting, which reduces the manufacturing costs of the pinion.

In a step E4, the cross-linked structure 5 is positioned against the front wall 32, previously obtained. In the present example, the cross-linked structure 5 is positioned so as to be in contact with the internal face of the rim 4 (the interface I in FIG. 2a).

The cross-linked structure 5 was previously obtained by repetition of one (or possibly several) three-dimensional cell(s). The cross-linked structure is manufactured either during the step E1, or directly against the front wall 32, or prior to the implementation of the method 100.

In a step E5, the rear wall 33 of the web 3 against the cross-linked structure 5 is obtained. The rear wall 33 is preferably obtained by additive manufacturing, preferably by selective laser melting on a powder bed. The rear face of the cross-linked structure 5 is used as a support for the manufacture of the rear wall 33, which allows dispensing with a separate mechanical part forming a support.

Between the steps E3 and E5, a stacking of the front wall 32, then of the cross-linked structure 5, and finally of the rear wall 33, is thus accomplished.

The respective densities of the front wall and of the rear wall of the web are both strictly greater than the density of the cell of the cross-linked structure, or if applicable greater than the densities of each of the cells used in the cross-linked structure.

At the conclusion of the method 100, a pinion is obtained which incorporates the cross-linked structure 5 within the internal volume of the web 3.

The method 100 supplies a simple and rapid solution for the manufacture of the pinion.

Very advantageously, the pinion can be entirely produced by additive manufacturing, for example by selective laser melting or SLM. The entire pinion can then be manufactured in a single piece. One advantage of selective laser melting is the possibility of optimizing the mechanical properties of the different zones of the part, depending on the expected mechanical stresses on the pinion under load, and limiting the total mass of the elements of the part.

The hub 2, the web 3 and the rim 4 of the pinion are advantageously manufactured of a metallic material, steel for example. Alternatively, these parts can consist entirely or in part of a thermoplastic polymer, for example polyether ether ketone, usually designated by the abbreviation PEEK.

Obtaining the pinion by additive manufacture generally allows designing the part optimally while maximally approaching functional needs, particularly in terms of modal behavior and deformation of the pinion under load. Additive manufacturing allows optimizing the mechanical properties of each zone of the part depending on the expected stress levels.

The optimization of the mechanical properties of the pinion go together with an improvement in mass. The cross-linked structure has a mass that is less than that of a solid web which would occupy the same space, because the density of the unit cell is less than those of the front and rear walls delimiting the web axially. The on-board mass of a turbomachine comprising the pinion is therefore reduced.

According to a preferred variant of the method, during the positioning E4 of the cross-linked structure 5 against the front wall 32, contact between the front wall and the cross-linked structure is accomplished with a first inclination designated relative to a plane orthogonal to the axis A. The first inclination is greater than 20° with respect to said plane. When obtaining E5 the rear wall 33, contact between the rear wall and the cross-linked structure is accomplished with a second inclination, less than the first inclination.

By way of an example, in FIG. 2a, the two surfaces of the front wall 32 have an inclination of approximately 40° with respect to a plane orthogonal to the axis A (corresponding to a vertical direction in FIG. 2a). The two surfaces of the rear wall 33, for their part, have a very slight inclination with respect to said plane, less than 5°.

One advantage of this variant is that the cross-linked structure 5 serves as a support for the rear wall, during the step E5 of obtaining the rear wall. It is particularly advantageous to use in this manner the cross-linked structure 5 as a support when the front wall 32 and the rear wall 33 are obtained by additive manufacturing, particularly by selective laser melting on a powder bed.

Another advantage is that the cross-linked structure, which therefore serves as a support for the manufacture of the walls of the web 3, is integrated into the interior of the web of the final pinion. The cross-linked structure therefore has the double advantage of serving as a manufacturing support and allowing a reduction of the total mass of the pinion after manufacture, while retaining optimized mechanical properties for the pinion.

It is noted that alternatively, the rear wall can have a greater inclination than the front wall with respect to a plane orthogonal to the axis. It is then possible to manufacture the rear wall first, and to use the cross-linked structure as a support for obtaining the front wall.

The invention claimed is:

1. A pinion for an aircraft turbomachine gear train, the pinion comprising:
   a cylindrical body extending along an axis and configured to engage with a shaft received in the cylindrical body,
   a rim concentric with the cylindrical body, and
   a web delimited axially by a front wall and a rear wall and extending radially from the cylindrical body to the rim, each of the front and rear walls having a density,
   wherein the web comprises a cross-linked structure around the cylindrical body between the front wall and the rear wall,
   the cross-linked structure comprising a unit cell repeated along three axes of a three-dimensional coordinate system,
   a density of the unit cell being strictly less than each of the densities of the front and rear walls,
   wherein a ratio between a volume of the unit cell of the cross-linked structure and the total volume occupied by the unit cell of the cross-linked structure is less than or equal to 5%.

2. The pinion according to claim 1, wherein the cross-linked structure extends radially to an interface between the cross-linked structure and the rim.

3. The pinion according to claim 1, wherein the cross-linked structure has axial symmetry around the axis of the cylindrical body.

4. The pinion according to claim 1, wherein the front wall and/or the rear wall extends radially from the cylindrical body to the rim.

5. The pinion according to claim 1, wherein the rim comprises a cantilever extending axially beyond the front wall or beyond the rear wall.

6. The pinion according to claim 1, wherein a radial distance between the cross-linked structure and the cylindrical body in any axial position along the axis is greater than a nonzero minimum radial gap.

7. The pinion according to claim 1, wherein the front wall and the rear wall have a material continuity with the cylindrical body and with the rim, the front and rear walls joining the rim at an interface between the cross-linked structure and the rim.

8. The pinion according to claim 1, wherein the unit cell of the cross-linked structure has a hexagonal diamond geometry.

9. A reduction gearbox for a turbomachine,
   the reduction gearbox comprising a reduction gear train configured to couple in rotation a turbine shaft of a turbomachine and an output shaft of the turbomachine,
   the reduction gear train comprising a pinion according to claim 1.

10. An aircraft turbomachine comprising the shaft and a pinion according to claim 1, the shaft being coupled in rotation with the pinion.

11. An aircraft comprising a turbomachine according to claim 10.

12. A helicopter turbine engine comprising at least one shaft and comprising a pinion according to claim 1, the shaft being coupled in rotation with the pinion.

13. A pinion for an aircraft turbomachine gear train,
    the pinion comprising:
    a cylindrical body extending along an axis and configured to engage with a shaft received in the cylindrical body,
    a rim concentric with the cylindrical body, and
    a web delimited axially by a front wall and a rear wall and extending radially from the cylindrical body to the rim, each of the front and rear walls having a density,
    wherein the web comprises a cross-linked structure around the cylindrical body between the front wall and the rear wall,
    the cross-linked structure comprising a unit cell repeated along three axes of a three-dimensional coordinate system,
    a density of the unit cell being strictly less than each of the densities of the front and rear walls,
    wherein the rim comprises a cantilever extending axially beyond the front wall or beyond the rear wall, and
    wherein an average axial width of the cantilever is less than 80% of an average axial width of the rim.

14. A manufacturing method for a pinion for an aircraft turbomachine gear train,
    the method comprising successive steps of:
    obtaining (E2) a cylindrical body of the pinion;
    obtaining (E3) a front wall of a web of the pinion and obtaining a rim which has material continuity with the front wall, the front wall having a density;
    positioning (E4) against the front wall a cross-linked structure comprising a repetition of a unit cell along three axes of a three-dimensional coordinate system, a density of the unit cell being strictly less than the density of the front wall; and
    obtaining (E5) a rear wall of the web of the pinion against the cross-linked structure, a material of the rear wall having a density strictly greater than the density of the cross-linked structure,
    the cylindrical body, the front and rear walls of the web and the rim being obtained in a single piece by additive manufacturing,
    the web incorporating the cross-linked structure,
    wherein a ratio between a volume of the unit cell of the cross-linked structure and the total volume occupied by the unit cell of the cross-linked structure is less than or equal to 5%.

15. The manufacturing method according to claim 14, comprising obtaining the front wall and/or the rear wall of the web by selective laser melting on a powder bed.

16. The manufacturing method according to claim 14, comprising a step (E1) of obtaining the cross-linked structure,
    the step comprising the repetition of the unit cell along the three axes to obtain a deformable matrix and comprising a deformation of the deformable matrix to confer a predetermined shape on the deformable matrix.

17. The manufacturing method according to claim 16, wherein the deformation of the deformable matrix is performed by stretching.

18. The manufacturing method according to claim 14, wherein:
the positioning step (E4) comprises accomplishing contact between the front wall and the cross-linked structure with a first inclination with respect to a plane perpendicular to the axis of the cylindrical body, and
the step of obtaining (E5) the rear wall comprises accomplishing contact between the rear wall and the cross-linked structure with a second inclination with respect to the plane, the second inclination being strictly less than the first inclination, the cross-linked structure serving as a support for obtaining the rear wall.

19. The manufacturing method according to claim 18 wherein the first inclination is greater than 20 degrees.

* * * * *